United States Patent [19]

Pricone et al.

[11] Patent Number: 5,310,436
[45] Date of Patent: May 10, 1994

[54] PREPRINTED RETROREFLECTIVE HIGHWAY SIGN AND METHOD FOR MAKING THE SIGN

[75] Inventors: Robert M. Pricone, Libertyville; Richard Zanotti, Hoffman Estates; Alex A. Szopinski, Des Plaines, all of Ill.

[73] Assignee: Stimsonite Corporation, Niles, Ill.

[21] Appl. No.: 926,984

[22] Filed: Aug. 7, 1992

Related U.S. Application Data

[62] Division of Ser. No. 687,989, Apr. 19, 1991, Pat. No. 5,213,872.

[51] Int. Cl.⁵ .................... B29C 59/02; B29D 11/00
[52] U.S. Cl. ................................ 156/209; 156/277; 156/278; 156/289
[58] Field of Search ............... 156/209, 277, 278, 289; 264/1.6, 1.9

[56] References Cited

U.S. PATENT DOCUMENTS

| | | |
|---|---|---|
| 2,354,048 | 7/1944 | Palmquist . |
| 2,647,849 | 8/1953 | Douglas et al. . |
| 3,146,492 | 9/1964 | Lemelson . |
| 3,176,420 | 4/1965 | Alverson . |
| 4,153,412 | 5/1979 | Bailey . |
| 4,601,861 | 7/1986 | Pricone et al. . |
| 4,618,518 | 10/1986 | Pricone et al. . |
| 4,664,966 | 5/1987 | Bailey et al. . |
| 4,767,659 | 8/1988 | Bailey et al. . |
| 4,916,007 | 4/1990 | Manning et al. . |
| 4,983,436 | 1/1991 | Bailey et al. . |
| 5,019,202 | 5/1991 | Kawahata et al. . |
| 5,085,918 | 2/1992 | Rajan et al. . |

OTHER PUBLICATIONS

Modern Plastics Encyclopedia, Oct. 1986 vol. 63, No. 10A, pp. 23-25.

*Primary Examiner*—Michael W. Ball
*Assistant Examiner*—Richard Crispino
*Attorney, Agent, or Firm*—Jones, Day, Reavis & Pogue

[57] ABSTRACT

A retroreflective unitary laminate material having an acrylic layer on which a sign legend is printed and which is covered by an ultraviolet absorbent overlay that has poor affinity for paint and low surface tension thus protecting the printed sign from deterioration due to weathering and enabling the sign to be readily cleansed without damaging the printed signs, and minimizing water beading on the sign front face.

13 Claims, 2 Drawing Sheets

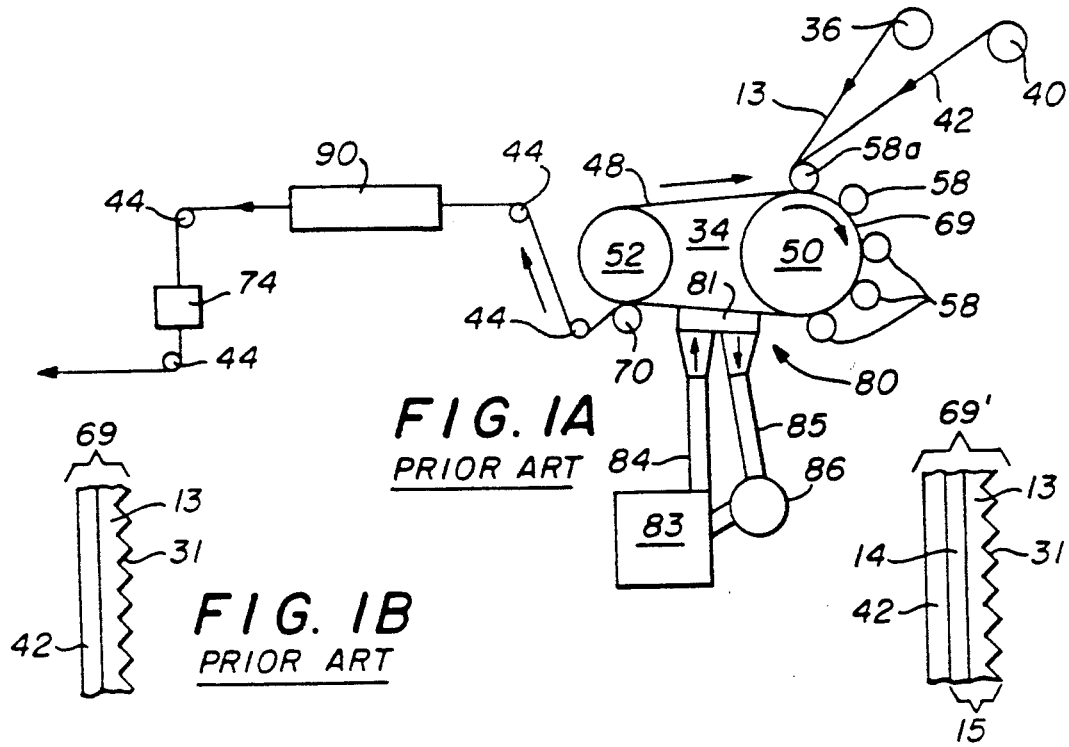
FIG. 1A PRIOR ART
FIG. 1B PRIOR ART
FIG. 1C PRIOR ART
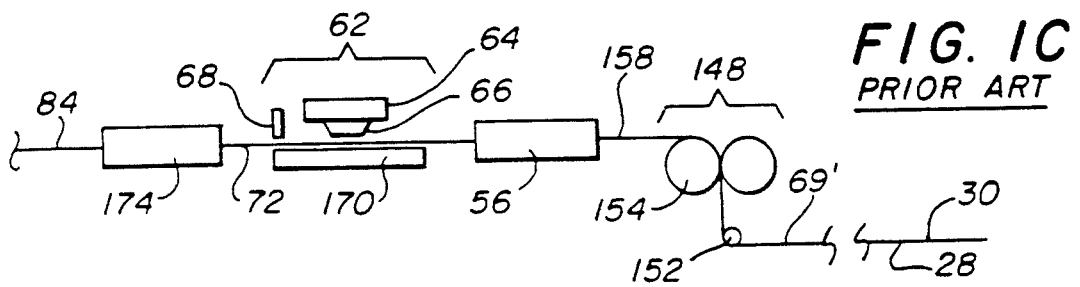
FIG. 2 PRIOR ART
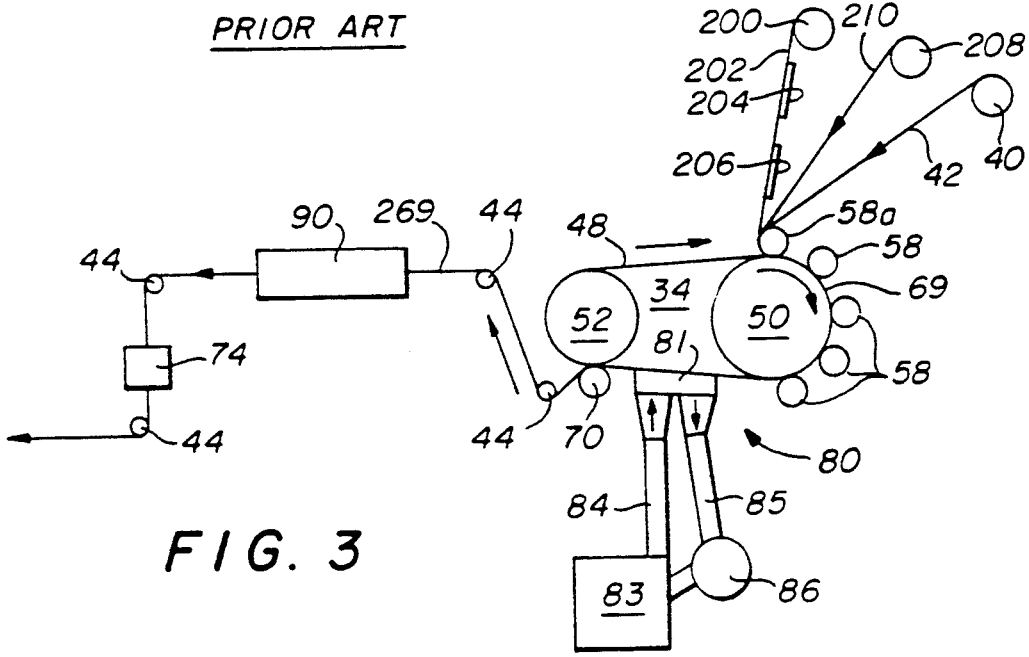
FIG. 3

5,310,436

PREPRINTED RETROREFLECTIVE HIGHWAY SIGN AND METHOD FOR MAKING THE SIGN

This is a divisional of copending application Ser. No. 07/687,989, filed Apr. 19, 1991, now U.S. Pat. No. 5,213,872.

FIELD OF THE INVENTION

This invention relates to preprinted retroreflective highway signs and an improved method for producing the signs.

BACKGROUND OF THE INVENTION

Retroreflective highway sign manufacture is relatively labor intensive and causes certain environmental concerns. Moreover, such signs are frequent targets of "spray can" vandalism. Present signs also "black out" under certain climatic conditions. The present invention presents a unique approach to the efficient manufacture of preprinted signs allowing for their more efficient and economic manufacture; the method enables the reduction of some environmental problems encountered at sign shops, and permits the manufacture of retroreflective highway signs which are more vandal resistant and less subject to black outs.

U.S. Pat. Nos. 4,601,861 and 4,618,518, assigned to Applicants' assignee, both disclose retroreflective sheeting and method and apparatus for embossing a precision optical pattern in a resinous sheet or laminate. In particular, those patents relate to cube corner type retroreflective sheeting having particular use in making highway signs, street signs and the like. Both of those patents are incorporated herein by reference in their entirety. The present invention is a significant improvement of the sheeting produced generally in accordance with such patents.

Currently highway signs generally are made in sign shops, which receive rolls containing continous sheets of previously produced retroreflective material. The rolls generally contain some form of adhesive backing protected by a release liner. In order to prepare the signs, the release liner is removed to expose an adhesive backing which allows the retroreflective sheeting to be applied to the sign substrate. Excess sheeting overhanging the sign substrate is then trimmed off.

A legend of any desired color or shape is then printed on the front face of the sheeting that is mounted on the sign substrate. The paint or ink used for printing the legend must permanently adhere to the surface and thus the outer or front surface of the reflective sheeting requires a material having an affinity for paint. (For purposes hereof, the term "paint" or "printed" will encompass any material such as inks, paints or the like used by sign shops to apply the desired final legend to the sign.) The paint is allowed to dry, generally for 24 hours, and then an overlay of clear coating is applied and allowed to dry for another 24 hours, to form the completed sign.

Being the normal method used in the industry to produce road signs, the surface of the sheeting can be seriously damaged when exposed to vandalism. If the vandals spray paint on the sign face, the paint is difficult, if not impossible, to remove, because the retroreflective material itself has an affinity for paint. Strong solvents cannot be used because they would destroy the legend on the sign's front face.

Another significant disadvantage is that the painting of the legend, and the drying steps, both labor intensive, must take place in the sign shop. However, the volatile type materials used in the printing and finishing of the signs and in their curing, produce environmentally objectionable waste materials and vapors. Even the towels and rags used for cleaning purposes during the printing and coating operations, increasingly are more difficult to dispose of in compliance with various state and federal environmental regulations.

The present invention materially overcomes both the labor intensive aspects at the sign shops, in which the printing and coating steps each may take 24 hours of drying time. It also may significantly eliminate the use of some environmentally objectionable materials.

Another problem with prior art signs, is that under certain climatic conditions dew, or water beads, form on the sign's front surface. The dew, by distorting the incoming and outgoing light rays, effectively diminishes the retroreflective capability of the sign, thus rendering the sign, its background and perhaps the legend, totally non-retroreflective. This condition often is referred to as a "dew-out".

The present invention overcomes the disadvantages of the prior art by providing a retroreflective material which, when formed, has the particular sign legend formed below the outer surface and prior to being embossed, with the coating, adhesive and back cover or release liner added thereafter to form the completed laminate.

It is a primary object of the present invention to provide a unitary reflective material for use in sign making which has the legend of desired shape and color printed on a surface of a resinous material that is then covered by an ultraviolet absorbent overlay that has a poor affinity for paint to protect the sign from not only the sunlight but also from permanent damage due to external events such as painting by vandals.

A significant advantage of the pre-printed signs formed by the present invention is that, because the outer layer is not restricted to materials that accept printing inks, not only can the new sign be made both vandal and solvent resistant, but by the proper selection of the front surface resin to include one having a low surface energy minimizing water beads, the "dew out" condition frequently observed in existing signs may be minimized so the loss of retroreflectivity attributed to the dew may be significantly reduced.

The term "legend" as used herein means any particular combination of words and/or symbols and/or colors intended to convey some message--such as "Stop"; "Yield" or any other instruction or warning.

In the present invention, a sheet of resinous material, which may be a thermoplastic type of material such as acrylic, has printed thereon the desired legend with a paint formulated to meet the color requirements and which remains stable through the heat of processing. An ultraviolet absorbing overlay is bonded by laminating it to the surface of the resinous material having the legend thereon to protect the legend from the deleterious effect of weathering. The ultraviolet absorbing overlay preferably also is a material having a poor affinity for paint and thus, in the final product, can be cleaned if marred by vandals; it also will be dew resistant.

The present invention, by employing such embossing processes and apparatus provides an efficient and economical method of forming rolls of retroreflective materials containing a succession of preprinted legends thereon.

In the preferred form, after the preprinted material has been passed through the embossing machine, it may be passed through the other stages described in the prior art patents, where a layer of hydrophobic granular silica material is applied to the embossed side of the resinous sheeting material to provide a cell pattern and to enhance the daytime whiteness of the product. A protective back coating is then applied to the silica and exposed rear surfaces to form a smooth surface; adhesive is then applied to the coating. A removable release liner is applied to the adhesive to prevent accidental contact with the adhesive and to allow winding and further handling.

With the present invention, a roll of the sheeting material is then sent to the sign shop where it may be simply unwound using standard equipment in the industry, which removes the release sheet and applies the retroreflective material to a prepared sign substrate. Excess material is then trimmed and the sign is completed. There is no printing nor curing required.

Thus, it is an object of the present invention to provide a method of making a retroreflective material for use in signs wherein a desired legend is printed on one surface of a resinous sheeting material and which is covered by an ultraviolet (UV) absorbent overlay to reduce damage to the legend by sunlight. The overlay, also having a poor affinity for paint, allows the sign to be cleaned in the case of damage such as by vandals applying paint thereto.

In summary, the present invention achieves four significant advantages: First, the preprinted signs, having the UV absorbing material on the outer surface with the printed legend below that surface, gives certain sign processing advantages and longer life, while effectively reducing the labor intensive aspects of producing the sign. Second, the preprinted signs, being formed with a weatherable outer surface that has a poor affinity for paint, can be cleaned with a solvent which renders the sign more vandal resistant. Third, the outer surface material may be of a composition that provides low surface tension to inhibit water beading or "dew outs". Finally, the pre-printing may reduce some of the environmental problems presently associated with on site sign printing at numerous sign shops.

SUMMARY OF THE INVENTION

The present invention relates to a method of making a reflective material for use in retroreflective sign making comprising the steps of printing a series of a desired legend on one surface of a resinous sheeting material, placing an ultraviolet absorbent overlay over the legend on the surface of the resinous material to protect the legend, imposing a removable layer of film over the ultraviolet absorbent overlay, and embossing the unprinted surface of the resinous sheeting material with a precision optical embossing pattern to form a unitary retroreflective material for use in making signs.

It is also an object of the present invention to provide a unitary preprinted retroreflective material for use in sign making comprising a resinous sheeting material, a sign legend of desired shape and color printed on one surface of the resinous material, an ultraviolet absorbent overlay placed over the surface of the resinous material having the legend thereon to shield the printed legend from ultraviolet rays, and a precision optical pattern embossed on the other surface of the resinous sheeting material to form the unitary retroreflective material.

BRIEF DESCRIPTION OF THE DRAWINGS

These and other objects of the present invention will be more clearly understood in connection with the accompanying detailed description of the attached drawings in which:

FIG. 1A is a schematic representation of the prior art apparatus for producing retroreflective sheeting;

FIG. 1B is representative of one form of the embossed sheeting formed on the prior art apparatus of FIG. 1A;

FIG. 1C is representative of the preferred commercial form of prior art embossed sheeting;

FIG. 2 is a schematic and symbolic view of the processes and machinery utilized to complete the prior art retroreflective sheeting and for completing the preprinted retroreflective sheeting of the present invention;

FIG. 3 is a schematic representation of the preferred apparatus constructed in accordance with the present invention for producing the novel preprinted retroreflective sheeting which is resistant to harm done by ultraviolet rays of the sun and which is more easily maintained in a clean condition than the prior art signs and which is dew resistant;

DETAILED DESCRIPTION OF THE DRAWINGS

Figure 4A:
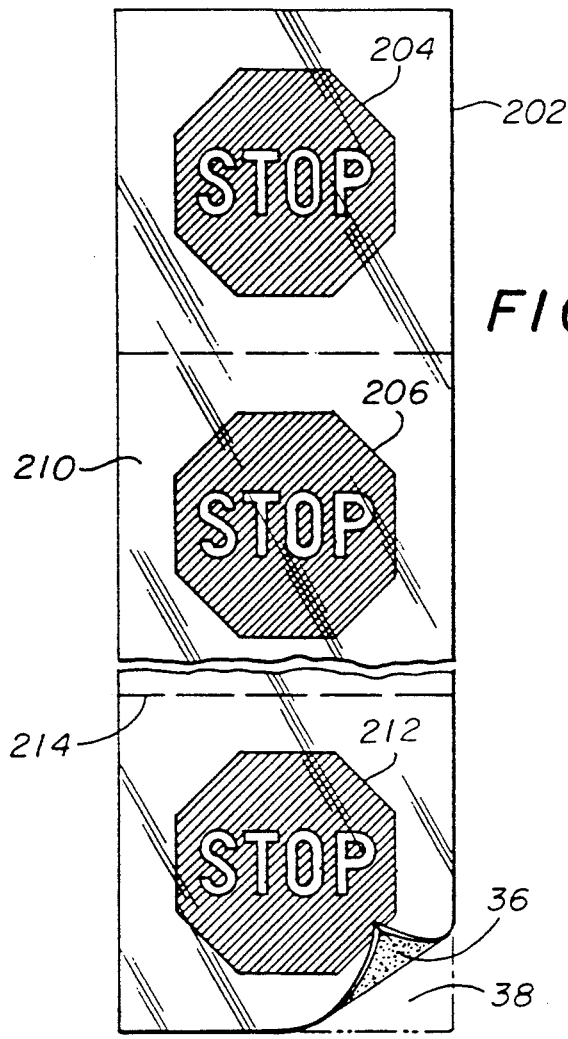
FIG. 4A is a plan view of a sheet of resinous material having a "Stop" sign legend painted thereon and illustrating how it can be produced in a roll and then cut and attached to a substrate to form individual signs.

FIG. 1 is a schematic representation of the machine as disclosed in U.S. Pat. No. 4,601,861, assigned to applicants' assignee, for producing cube corner type retroreflective sheeting. As can be seen in FIG. 1, a supply reel 36 of unprocessed acrylic web 13 is mounted on the right hand end of the machine, as is a supply reel 40 of transparent plastic film such as Mylar film 42. Mylar is the DuPont trademark for biaxially oriented polyester film.

In the illustrated embodiment, the web 13 may be 0.006" thick and the film 42 may be 0.002" thick and may be of any desired width, up to the width of the processing machinery as discussed hereafter.

The flat web 13 and the film 42 are fed from reels 36 and 40, respectively to the embossing means 34 over guide rollers (not shown) in the direction of the arrows.

The embossing means 34 includes an embossing tool in the form of an endless electroformed metal belt 48 which may be about 0.020" to 0.030" in thickness and 115" in "circumference" and 57" wide. The width and circumference of the belt 48 will depend in part upon the width of the material to be embossed and the desired embossing speed and the thickness of the belt 48. Belt 48 is mounted on and carried by a heating roller 50 and a post cooling roller 52 having parallel axes. Rollers 50 and 52 may be driven by chains (not shown) to advance belt 48 at a predetermined linear speed in the direction of the arrow. Belt 48 is provided on its outer surface with a continuous female embossing pattern 16 which is shown in U.S. Pat. No. 4,601,861.

Spaced sequentially around the belt for about 180 degrees around the heating roller 50 are a plurality of pressure rollers 58 of a resilient material, preferably silicone rubber, with a durometer hardness ranging from Shore A 20 to 90, but preferably, from Shore A 60 to 90. While rollers 50 and 52 do not necessarily have to be the same size, in one embodiment the diameter of heating roller 50 and the post cooling roller 52 is about 21¼". The diameter of each roller 58 is about 11". For purposes of illustration, the spacing between rollers 50 and 52 is shown as greatly exaggerated, given the dimension of the rollers 50, 52 and the belt 48. It would be understood that the gap or free area between the rollers will differ depending on the selected dimensions of the belt 48 and rollers 50 and 52.

The web 13 and the film 42, as stated, are simultaneously fed to embossing means 34, where they are superimposed to form a separable laminate 69 which is introduced between the belt 48 and the leading pressure roller 58a with the web 13 between the film 42 and the belt 48. One face of the web 13 directly confronts and engages the embossing pattern on the belt 48 and one face of the film 42 directly confronts and engages pressure rollers 58. The laminate 69 is moved with the belt 48 to pass under the remaining pressure rollers 58 and around the heating roller 50 and from thence along belt 48 through a general planar cooling station 80 located between the heating roller 50 and post cooling roller 52. The operation of the cooling station 80 is described in detail in U.S. Pat. No. 4,601,861.

The embossing means 34 includes a stripper roller 70, around which laminate 69 is passed to remove the same from the belt 48 shortly after the belt 48 itself contacts post cooling roller 52 on its return path to the heating roller 50. The laminate 69 then continues through the path illustrated in FIG. 1 to complete the embossed sheeting.

As previously manufactured, an additional supply roll (not shown) also may be used to provide a layer 0.002" thick of VCF A-223 film (VCF is the tradename of VCF Films Division of PMC Inc. for an acrylic copolymer with an ultraviolet absorbing material to enhance weathering). Under this prior preferred process, the acrylic web 13 is 0.006" thick and is designated PSR 9, which is a modified version of an impact modified acrylic resin produced by Rohm & Haas, and known as DR, further modified with a UV absorber, Cyasorb 5411 made by Cynamid Corporation. During embossing, the thermoplastic layers 13 and 14 fuse under heat and pressure to form an unseparable laminate, shown as 15 in FIG. 1C. In FIG. 1C, the full laminate 69' consists of the removable Mylar film 42, a layer 14 of VCF A223 and the embossed layer 13 of PSR9 acrylic.

The retroreflective sheeting is completed by adding hydrophobic silica material to enhance reflectivity and whiteness, and by adding a back coating and an adhesive, using the apparatus shown in FIG. 2 and as disclosed in U.S. Pat. No. 4,618,518.

In FIG. 2, the partially embossed laminate 69' (only one side of web 15 is embossed) produced by the apparatus of FIG. 1 may be drawn directly from the forming mechanism shown in FIG. 1 in a continuous process, or may be drawn from a separate supply reel onto which the embossed laminate has been wound. As stated, web 15 is supported by a Mylar backing film 42 coextensive with face 28 leaving surface 30 exposed with the embossed cube corner elements 31.

The laminate 69 is drawn, for example, by powered rollers to hydrophobic silica mixture application station 148. As herein diagrammatically shown, a preferred means and method of applying the hydrophobic silica mixture to surface 31 may be accomplished through use of a screen printing drum 150 as disclosed in U.S. Pat. No. 4,618,518. The preferred form of the silica mixture is also disclosed in U.S. Pat. No. 4,618,518. Thus, as laminate 69 exits mixture application station 148, it has taken on the form of a first modified laminate 158 in the form of a web preferably having embossed cube corner elements 31 with a precisely formed pattern of hydrophobic silica mixture screened thereon (32 in FIG. 5) over a portion of the cube corner elements 31, with uncovered portions of the cube corner elements still exposed.

The laminate 69 is dried at station 56 and takes on a second modified laminate construction wherein the organic solvents present in the silica mixture have been driven off and the silica layer itself has remained dried into its screened-on pattern. It then enters a back coating application station 62 as disclosed in U.S. Pat. No. 4,618,518.

The application of the water based back coating (134 in FIG. 5) accomplishes several results. First, those areas onto which no silica has been screened or deposited will allow direct contact between the back coating and the reverse side 30 of the embossed or otherwise formed thermoplastic web 13 thus "wetting" exposed surfaces 31 of web 15 with the liquid back coating mixture. Second, a layer of back coating material will overlay the silica pattern formed on thermoplastic web 15 and, when applied effectively, will not disturb or disrupt the printed or screened on silica pattern. Third, the back coating may then be dried or cured to provide firm attachment to thermoplastic web 15 and provide a flat, smooth and integral surface upon which further layers, such as a layer of pressure sensitive or heat activated adhesive (36 in FIG. 5), may be effectively and conveniently applied and then a protective cover, such as release paper 38, applied thereto. After this is accomplished, the Mylar web 42 may be stripped from the laminate 69'.

While the retroreflective sheeting produced by the prior art apparatus and method disclosed above is highly effective, it then requires the additional steps to add the painted legend to the front surface of the retroreflective material and an additional clear overlay put over the painted area. Further, the VCF overlay material 14 must have an affinity for paint for the legend to be permanently painted thereon. In such case, it is difficult if not impossible to remove the applied paint. But this also means that paint sprayed on by vandals cannot be easily removed because the solvents to do so may damage the painted legend.

A retroreflective material of the present invention that overcomes the disadvantages set forth above can be produced with the apparatus illustrated in FIG. 3. As can be seen in FIG. 3, a supply reel 200 of acrylic web 202 (such as PSR9) is mounted on the right hand end of the machine. Acrylic web 202 has an affinity for paint and is provided with a plurality of spaced preprinted legends, represented by the numerals 204 and 206, which have been painted on one side of the web 202. Supply reel 208 contains an ultraviolet absorbent overlay 210 that is fed parallel with and over the painted side of the web 202. A supply reel 40 of transparent Mylar plastic film 42 also is provided. This is similar to the prior art operation except that now the sign legend is preprinted on one surface of the web 202 which, as noted hereafter, is unexposed in use.

The webs 202 and 210 and Mylar film 42 are fed together from reels 200, 208 and 40, respectively, to the embossing means 34 under guide rollers 58 in the direction of the arrows.

The overlay web 210 is an ultraviolet absorbing sheet which has a poor affinity for paint. It may be of the type known as Kynar, Tedlar or any of the fluorinated resin blends. It is approximately 2 mils in thickness. It is feasible that other satisfactory resins may exist or be developed and which will have acceptable characteristics. The web 202 is the Rohm & Haas type known as PSR 9 (modified acrylic) and is approximately 6 mils thick. The paint is silk screen or gravure such as Product No. 90088 copolymer of vinyl chloride and vinyl acetate color TMI II, Stop Sign Red produced by Sinclair Valentine and when applied has a thickness of about 0.0003".

Surprisingly it has been found that the printed or painted legend is not materially distorted nor adversely affected by its passage through the embossing equipment.

An additional significant advantage to this construction permits the use of an outer surface not only having a poor affinity for paint, allowing the use of solvents to remove paint applied by vandalism, but the same outer surface uses one of several fluorinated resins which have a low surface tension, which significantly reduces the effect of dew on roadsigns and the loss of reflectivity attributed to dew.

After passing through the embossing means 34 as disclosed in U.S. Pat. No. 4,601,861, webs 202 and 210, both being thermoplastics, fuse together to form a unitary laminated sheet. The temperature at embossing is low enough so that it does not fuse the Mylar. The Mylar sheet 42 provides strength to the webs 202 and 210 while they are passing through the embossing machine. When the laminate 269 comes out of the machine illustrated in FIG. 3, the retroreflective sheeting may be completed with the process illustrated and described with reference to FIG. 2. The machine in FIG. 3 otherwise functions as set forth in U.S. Pat. No. 4,601,681.

Figure 4B:
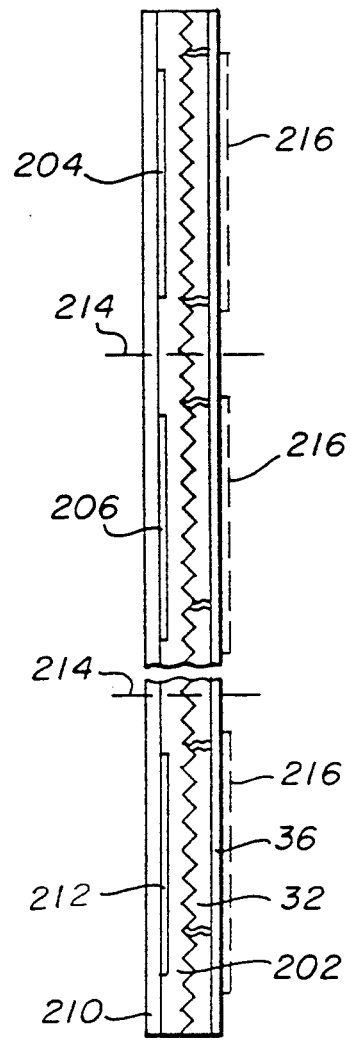
FIG. 4B is a side view of the sheet and is a diagrammatic form of a sign illustrated in FIG. 4A.

FIG. 4A illustrates a length of the laminate on which legends 204, 206 and 212 have been printed on the web 202 and covered by the protective web 210 and from which the Mylar 42 has been stripped. A release liner 38 is applied to the bottom surface of the sheet. In the particular case illustrated, the legend is shown as a "STOP" sign. FIG. 4B is a side view of the web 202 illustrated in FIG. 4A and illustrates the legends 204, 206 and 212 painted thereon. To use the laminate with heat applied adhesive to make a sign, the sign shop need simply cut the material at the desired length, such as along dashed line 214, peel off the outer protective liner 38 to expose the adhesive 36, and place the adhesive side on a prepared substrate illustrated by dashed lines 216 and then process using a vacuum applicator. Substrate 216 may be of any desired material.

Reflective sheeting may be provided to sign shops with either such heat applied adhesive or by pressure applied adhesive. In the case of heat applied adhesive the product is processed using what is commonly known in the industry as a vacuum applicator which through the use of heat and vacuum applies the sheeting to one of many sign backings.

In the case of pressure applied adhesive, the product is processed using what is commonly known in the industry as a squeeze roll application which typically uses 150 ft. rolls of sheeting by unwinding the roll, removing the release liner and pressing the adhesive side to the sign backing by using rubber pressure rollers.

One example of the retroreflective material to be formed by the present invention is presented herewith as Example 1:

EXAMPLE 1

A roll of 6 mil acrylic web known as PSR 9 having a red colored STOP sign legend printed thereon was combined with an ultraviolet absorbing overlay of a material of the prior VCF resin having a 2 mil thickness. The sheets were 52 inches wide and 2,000 feet long. They were fed through the apparatus of FIG. 3 with a sheet of Mylar covering the embossing ultraviolet absorbing overlay. The resulting product was a unitary retroreflective laminate in which the entire acrylic web, having an affinity for paint, was covered by the ultraviolet absorbing overlay. Tedlar resin was separately subjected to surface paint tests, and it was found that the paint was easily removed with a solvent of the type known as MEK (methylethyl ketone) and it is believed that suitable fluorinated resins can be run through the embossing equipment in a manner comparable to the VCF, to accomplish the intended objectives.

The laminate was then completed in its processing with the machinery illustrated in FIG. 2, wherein the hydrophobic silica coating was applied as indicated earlier and an adhesive layer was applied to the back coating with a protective covering on the adhesive to prevent inadvertent contact with the adhesive. The retroreflective properties of the completed roll were at least equal to like signs produced by the conventional sign shop techniques.

Figure 5:
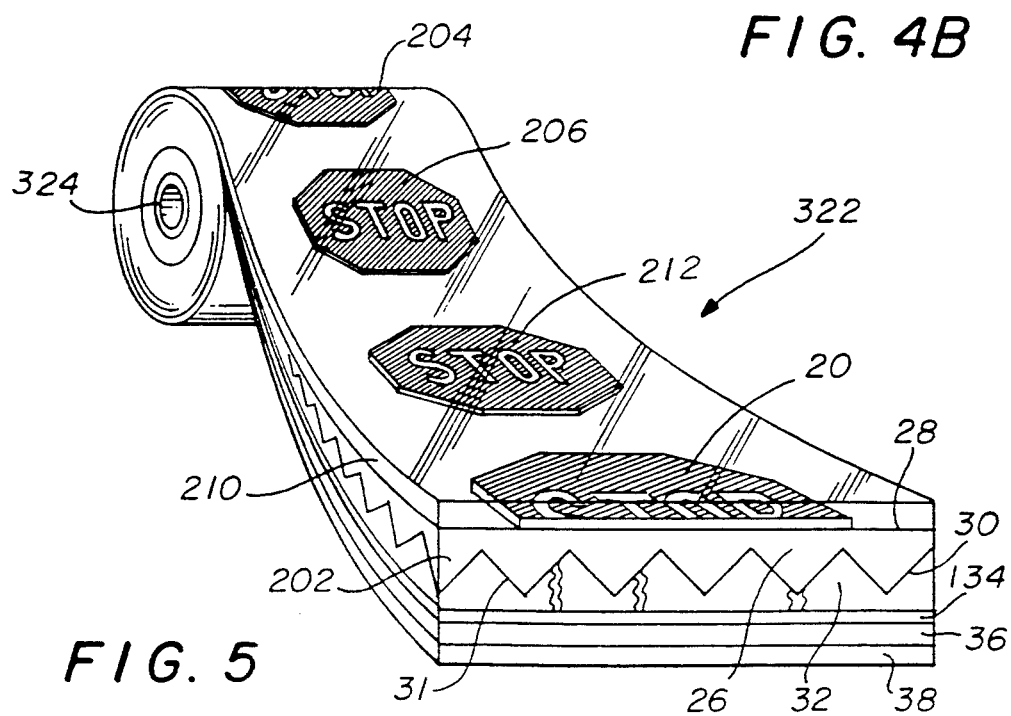
FIG. 5 is a perspective, somewhat schematic view, of a roll of one form of preprinted retroreflective sheeting produced by the present invention after further processing has rendered the sheeting ready for installation at a sign shop.

FIG. 5 indicates generally a roll of unitary preprinted retroreflective sheeting 322 manufactured in accordance with the preferred aspects of the present invention. As shown, sheeting 322 is rolled onto a core 324. A thermoplastic web 202 has, in use, a front or forward facing surface 28 and a rear or reverse facing surface 30 upon which is embossed the cube-corner type retroreflective pattern 31 as illustrated in U.S. Pat. No. 4,618,518. The thermoplastic acrylic web 202 may be on the order of 6 mils. (0.006 inch) in thickness. On the forward surface 28 a plurality of spaced preprinted legends 204, 206, and 212 are shown for example only. The paint may be of the type generally known in this industry as silk screen inks having the required color characteristics.

The overlay 210 is placed over and bonded to the forward surface 28 of web 202 thus covering the painted legends 204, 206, etc. Overlay 210 preferably is of a fluorinated resin such as Tedlar (polyvinylidene fluoride) or Kynar (polyvinyl fluoride) or any of several blends of fluorinated resins which are resistant to cleaning with solvents, are UV weatherable, and are dew resistant. Web 210 is approximately 1 to 2 mils (0.002 inch) in thickness. Preferably it should have a poor affinity for paint, a low surface tension to minimize water beading and have excellent ultra-violet ray absorbing characteristics. Thus, it protects the painted legends from weathering and ultraviolet rays. Further, because it has a poor affinity for paint, any paint or other materials placed thereon by vandals or otherwise can be readily removed by solvents without destroying the legend below the outer surface, thus maintaining the integrity and usability of any sign made from the laminate.

Bonded to the rear facing surface 30 of the thermoplastic web 202 having the embossed retroreflective pattern 31, is the hydrophobic granular silica material 32 that protects against loss of retroreflectance during back coating and improves the whiteness of diffusely reflected light. Bonded to the silica material 32 is a back coating or film 134 and a layer of adhesive 36 bonded on one side to a release sheet 38 in a presently well known fashion. The release sheet 38 is used to protect the adhesive layer 36 until it is desired to apply laminate 322 to a given surface or substrate 216.

Thus, the present invention provides a novel improvement over the prior art. By providing the retroreflective sheet 322 with the preprinted legend covered by an outer layer of material that has poor affinity for paint and low surface tension, a sign forming laminate is prepared which may be simply applied to a base or substrate prepared for it, the release liner removed to expose the adhesive and the laminate adhesively being attached to the substrate to form the sign. This sign will provide long use because of its resistance to weathering by moisture and ultraviolet rays and can be readily maintained in a clean condition because of the poor affinity of the ultraviolet absorbing outer material for paint.

While the invention has been shown and described with respect to a particular embodiment thereof, this is for the purpose of illustration rather than limitation; other variations and modifications of the specific embodiment herein shown and described will be apparent to those skilled in the art all within the intended spirit and scope of the invention. For example, instead of the hydrophobic silica and back coating applications, a thin metallic layer may be applied to the embossed cube corner elements in well known manner; other structures contemplate an "air cell" arrangement in which a back film is spaced from the embossed elements 31 and is secured along a selected pattern to provide a cell like structure. Similarly, other resins than acrylic (such as thermoplastics like polycarbonate and vinyl) may be used as the embossed material. Accordingly, the patent is not to be limited in scope and effect to the specific embodiment shown and described nor in any other way that is inconsistent with the extent to which the progress and the art has been advanced by the invention.

We claim:

1. A method of making a unitary preprinted retroreflective sheeting material for use in making signs, comprising the steps of:
   printing a desired legend on one surface of a resinous sheeting material;
   permanently bonding an ultraviolet absorbent overlay over the surface of the resinous material having the printed legend thereon to protect the printed legend; then
   embossing a precise optical pattern consisting of an array of cube-corner type retroreflective elements on the other surface of the resinous sheet material to form a unitary retroreflective material for use in making signs;
   and applying a rear surface overlaying the cube-corner optical pattern to permit later application of the retroreflective sheeting material to an underlying sign substrate.

2. The method of claim 1, and further comprising the steps of imposing a removable layer of film over the ultraviolet absorbent overlay prior to the optical pattern forming step.

3. The method as in claim 1 further comprising the steps of:
   adding a layer of hydrophobic granular silica material to the formed cube-corner retroreflective elements;
   applying a back coating over the hydrophobic granular silica on the rear surface of the sheeting, such that the hydrophobic granular silica protects the retroreflective elements from the back coating;
   placing an adhesive on the exposed side of the back coating to allow the preprinted retroreflective sheeting material to be attached to a desired substrate; and
   adding a removable release sheet to the adhesive.

4. The method as in claim 1, wherein the ultraviolet absorbing overlay is a fluorinated resin that resists paint adherence, to enable the sign to be cleansed without damaging the preprinted legend and to protect the sign from deterioration due to ultraviolet rays.

5. The method of claim 1, wherein the overlay is a fluorinated resin that resists paint adherence and has a low surface tension to enable the sign to be cleaned without damaging the preprinted legend and to protect the sign from deterioration due to ultraviolet rays, while minimizing water beading on the sign front surface.

6. The method of claim 4, wherein the overlay is 2 mils. thick and the embossed resin is 6 mils thick.

7. The method as in claim 1, wherein the resinous material is an acrylic and the overlay is a fluorinated resin.

8. The method as in claim 1 wherein the retroreflective material is formed as a continuous sheet having a plurality of successively printed legends thereon.

9. A method of making a preprinted retroreflective sign material, comprising the steps of:
   printing a desired legend on one surface of a resinous sheeting material;
   placing an ultraviolet absorbent overlay over the surface of the resinous material having the printed legend thereon to protect the legend from ultraviolet radiation;
   imposing a removable layer of film over the ultraviolet absorbent overlay;
   embossing the unprinted opposite surface of the resinous sheeting material with a precise optical pattern of cube-corner type retroreflective elements to form a unitary sheet of retroreflective materials, while bonding the overlay to the printed surface;
   adding a layer of hydrophobic granular silica material to the embossed side of the unitary sheet over at least a portion of the retroreflective material;
   providing a back coating over the silica layer and any remaining exposed embossed areas;
   placing an adhesive on the exposed side of the back coating; and
   adding a removable release sheet to the adhesive.

10. The method of claim 9, further comprising the steps of:
    forming a substrate for use as a sign;
    removing the release sheet to expose the adhesive; and applying the unitary sheet of preprinted reflective material on the substrate to form a sign.

11. A method of making a unitary preprinted retroreflective sheeting material, for use in sign-making comprising the steps of:
   printing a desired legend on one surface of a resinous sheeting material;
   placing an ultraviolet absorbent overlay over the surface of the resinous material having the printed legend thereon to protect the legend from ultraviolet radiation;
   imposing a removable layer of film over the ultraviolet absorbent overlay;
   embossing the unprinted reverse surface of the resinous sheeting material with a precise optical pattern of cube-corner type retroreflective elements to form a unitary sheet of retroreflective material, while essentially concurrently bonding the overlay to the printed surface side of the sheeting material;
   providing a backing layer over at least a portion of the embossed retroreflective material;
   placing an adhesive on the exposed side of the backing layer; and
   adding a removable release sheet to the adhesive.

12. The method as in claim 11 wherein the ultraviolet absorbing overlay is a fluorinated resin that resists paint adherence, to enable the sheeting material to be cleansed without damaging the printing and to protect the sign from deterioration due to ultraviolet rays.

13. The method as in claim 12, wherein the resinous sheeting material is a thermoplastic acrylic resin having a thickness of about 6 mils, and the overlay has a thickness of about 2 mils.

* * * * *

UNITED STATES PATENT AND TRADEMARK OFFICE
CERTIFICATE OF CORRECTION

PATENT NO. : 5,310,436
DATED : May 10, 1994
INVENTOR(S) : Robert M. Pricone, et al It is certified that error appears in the above-indentified patent and that said Letters Patent is hereby corrected as shown below:

Column 9, line 67, change "overlaying" to --overlying.

Column 10, lines 7 and 8, claim 3, delete "further comprising the steps of" and add --wherein the step of applying a rear surface comprises--.

Signed and Sealed this

Thirty-first Day of January, 1995

Attest:

BRUCE LEHMAN

Attesting Officer

Commissioner of Patents and Trademarks